US012624187B2

(12) United States Patent
Steffens et al.

(10) Patent No.: US 12,624,187 B2
(45) Date of Patent: May 12, 2026

(54) METHOD FOR RECOVERING RAW MATERIALS FROM POLYURETHANE PRODUCTS

(71) Applicant: Covestro Deutschland AG, Leverkusen (DE)

(72) Inventors: Friedhelm Steffens, Leverkusen (DE); Sebastian Pohl, Grünstadt (DE); Shabnam Majidi Salehi, Cologne (DE); Jonas Krause, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 651 days.

(21) Appl. No.: 18/245,008

(22) PCT Filed: Sep. 21, 2021

(86) PCT No.: PCT/EP2021/075916
§ 371 (c)(1),
(2) Date: Mar. 13, 2023

(87) PCT Pub. No.: WO2022/063764
PCT Pub. Date: Mar. 31, 2022

(65) Prior Publication Data
US 2023/0357532 A1     Nov. 9, 2023

(30) Foreign Application Priority Data

Sep. 23, 2020     (EP) .................................... 20197639

(51) Int. Cl.
C08G 18/82     (2006.01)
C08J 11/24     (2006.01)

(52) U.S. Cl.
CPC ............... *C08J 11/24* (2013.01); *C08G 18/82* (2013.01); *C08J 2375/04* (2013.01)

(58) Field of Classification Search
USPC ....................................................... 521/49.5
See application file for complete search history.

(56) References Cited

U.S. PATENT DOCUMENTS

| | | | |
|---|---|---|---|
| 3,307,190 A | 2/1967 | Clay, Jr. et al. | |
| 4,317,939 A | 3/1982 | Gerlock et al. | |
| 4,336,406 A * | 6/1982 | Gerlock ................... | C07C 41/34 |
| | | | 568/613 |
| 4,720,326 A | 1/1988 | Beckhaus et al. | |
| 6,359,177 B1 | 3/2002 | Brady et al. | |
| 7,307,190 B2 | 12/2007 | Pennemann et al. | |
| 10,703,713 B2 * | 7/2020 | Loddenkemper ..... | C07C 263/20 |

FOREIGN PATENT DOCUMENTS

| | | |
|---|---|---|
| DE | 102012108261 A1 | 1/2014 |
| EP | 2540702 A2 | 1/2013 |

OTHER PUBLICATIONS

D. Simón, et al., Recycling of polyurethanes from laboratory to industry, a journey towards the sustainability, Waste Management, 2018, 76, pp. 147-171.
J. Braslaw, et al., Polyurethane Waste Recycling. 2. Polyol Recovery and Purification, Ind. Eng. Chem. Process Des. Dev. 1984, 23, 552-557.
International Search Report, PCT/EP2021/075916, date of mailing: Nov. 11, 2021, Authorized officer: Michael Niaounakis.

* cited by examiner

*Primary Examiner* — Terressa Boykin
(74) *Attorney, Agent, or Firm* — Donald R. Palladino

(57)     ABSTRACT

The invention relates to a method for recovering raw materials from polyurethane products, having the steps of: (A) providing a polyurethane product based on an isocyanate component and a polyol component; (B) reacting the polyurethane product with an alcohol in the presence of a catalyst, wherein a first product mixture containing alcohol, polyols, carbamates, and optionally water is obtained; (C) preparing the first product mixture, having the steps of: (C.I.) mixing the first product mixture obtained in step (B) with an organic solvent, which can be mixed with the alcohol used in step (B), optionally followed by a separation of solid components, thereby obtaining a second product mixture; (C.II) washing the second product mixture obtained in step (C.I) using an aqueous washing fluid, wherein carbamates contained in the second product mixture are hydrogenated partly while releasing amines and alcohol, and carrying out a phase separation into a first solvent phase, containing the organic solvent used in step (C.I) and polyols, and a first aqueous phase, containing water, alcohol, carbamates, and amines; and (C.III) processing the first solvent phase, thereby obtaining the polyols; and optionally (D) processing the first aqueous phase, thereby obtaining an amine which corresponds to an isocyanate of the isocyanate component.

17 Claims, 4 Drawing Sheets

METHOD FOR RECOVERING RAW MATERIALS FROM POLYURETHANE PRODUCTS

CROSS-REFERENCE TO RELATED APPLICATIONS

This application is a national stage application under 35 U.S.C. § 371 of PCT/EP2021/075916, filed Sep. 21, 2021, which claims the benefit of European Application No. 20197639.6, filed Sep. 23, 2020, each of which is incorporated herein by reference.

The project leading to the present application received funding under Grant Agreement No. 814543 as part of the European Union's Horizon 2020 research and innovation programme.

FIELD

The present invention relates to a method for recovering raw materials (i.e. polyols and optionally additional amines) from polyurethane products, comprising the steps of: (A) providing a polyurethane product based on an isocyanate component and a polyol component; (B) reacting the polyurethane product with an alcohol in the presence of a catalyst, to give a first product mixture containing alcohol, polyols and carbamates, and optionally water; (C) working up the first product mixture, comprising: (C.I) mixing the first product mixture obtained in step (B) with an organic solvent which is miscible with the alcohol used in step (B), optionally followed by a removal of solid constituents, to obtain a second product mixture; (C.II) washing the second product mixture obtained in step (C.I) with an aqueous wash liquid, whereby carbamates present in the second product mixture are partially hydrolyzed to release amines and alcohol, and phase separation into a first solvent phase containing organic solvent used in step (C.I) and polyols, and a first aqueous phase containing water, alcohol, carbamates and amines; and (C.III) working up the first solvent phase to obtain the polyols; and optionally (D) working up the first aqueous phase to obtain an amine corresponding to an isocyanate from the isocyanate component.

BACKGROUND

Polyurethane products enjoy a diversity of applications in industry and in everyday life. Distinctions are typically made between polyurethane foams and what are known as "CASE" products, with "CASE" being a collective term for polyurethane coatings (e.g., paints), adhesives, sealants and elastomers. The polyurethane foams are typically divided into rigid foams and flexible foams. Common to all of these products in spite of their heterogeneity is the basic polyurethane structure, which is formed by the polyaddition reaction of a polyfunctional isocyanate and of a polyol and which in the case, for example, of a polyurethane based on a diisocyanate O=C=N—R—N=C=O and a diol H—O—R'—O—H (where R and R' denote organic radicals) may be represented as

~~~[O-R'-O-(O = C)-HN-R-NH-(C = O)] ~~~

It is the great economic success of the polyurethane products that means that there are large quantities of polyurethane waste arising (from old mattresses or seated furniture, for example) that must be sent for rational use. The mode of reuse that is the easiest to implement technically is that of incineration, with the heat of combustion released being utilized for other processes, examples being industrial processes. However, this does not allow the raw materials loops to be completed. Another mode of use is that referred to as "physical recycling", which sees polyurethane wastes mechanically comminuted and used in the manufacture of new products. The obvious limits to this mode of recycling mean that there has been no lack of attempts to recover the raw materials underlying polyurethane production by rebreaking the polyurethane linkages (referred to as "chemical recycling").

These raw materials to be won back comprise primarily polyols (i.e., in the example above, H—O—R'—O—H). In addition it is possible through hydrolytic cleavage of the urethane bonding to recover amines as well (i.e., in the example above, $H_2N$—R—$NH_2$), which after workup can be phosgenated to form isocyanates (in the example above, to form O=C=N—R—N=C=O).

A variety of chemical recycling approaches have been developed in the past. The three foremost are briefly summarized as follows:

1. Hydrolysis of urethanes by reaction with water to recover amines and polyols with formation of carbon dioxide.
2. Glycolysis of urethanes by reaction with alcohols, where the polyols incorporated in the urethane groups are released by being replaced with the alcohol used. This process is commonly referred to in the literature as transesterification (more accurately: transurethanization). Regardless of the exact nature of the alcohol used, this mode of chemical recycling is dubbed glycolysis in the literature, a term that really applies only for glycol. In the present invention, therefore, the term used generally is alcoholysis. The glycolysis may be followed by a hydrolysis. If the hydrolysis is conducted in the presence of the as yet unchanged glycolysis mixture, this is called a
3. Hydroglycolysis of urethane compounds by reaction with alcohols and water. It is of course likewise possible to add alcohol and water from the start, in which case the above-described processes of glycolysis and hydrolysis proceed in parallel.

A summary of the known methods of polyurethane recycling is offered by the review article by Simón, Borreguero, Lucas and Rodriguez in *Waste Management* 2018, 76, 147-171 [1]. The article highlights glycolysis (2. above) as particularly significant. Within glycolysis, two-phase and single-phase regimes are differentiated, according to whether the crude process product of reaction with the alcohol is separated into two phases or not. This depends in particular on the choice of alcohol used and on the process conditions (especially the fraction of alcohol used in the reaction mixture, and the temperature). The aforesaid review article favors the two-phase regime using crude glycerol (wastes from biodiesel production, for instance), as it is said to have the greatest potential to recover high-quality products (the focus clearly on recovering the polyols) at low production costs.

The additional water makes the process product of hydroglycolyses (3. above) always two-phase. Braslaw and Gerlock in *Ind. Eng. Chem. Process Des. Dev.* 1984, 23, 552-557 [2] describe the workup of this kind of process product, comprising removal of the water (by laboratory-scale phase separation or by evaporation in a process recommended for industrial use and termed the "Ford Hydroglycolysis Process") and extraction of the remaining organic phase with hexadecane to form an alcohol phase, from which amine can be recovered, and a hexadecane phase, from which polyol can be recovered. Though mentioning the option of recovering amine, the emphasis in this article too is on recovering polyols.

A patent for a process operating on these principles was granted under number U.S. Pat. No. 4,336,406. Described therein is a process for recovering polyether polyol from a polyurethane by stages as follows:

(a) forming a solution by dissolving this polyurethane in a saturated alcohol having a boiling point of 225° C. to 280° C. at a temperature of 185° C. to 220° C. under a nonoxidizing atmosphere;

(b) reacting this solution under this nonoxidizing atmosphere in the presence of an alkali metal hydroxide catalyst with water for the required time so as to largely hydrolyze the hydrolyzable dissolution products to form amines and alcohol, while holding this solution at a temperature of 175° C. to 220° C., with this alkali metal hydroxide catalyst being added to the solution in an amount in the region of at least 0.1 mass %, based on the mass of this polyurethane foam;

(c) removing the water remaining after the hydrolysis from this solution under a nonoxidizing atmosphere;

(d) extracting this polyol from the hydrolyzed solution under a nonoxidizing atmosphere with an alkane that is substantially immiscible with this alcohol and has a boiling point of 230° C. to 300° C. (hexadecane in particular);

and (e) subjecting the extracted polyol to vacuum purification at a temperature below 230° C.

In step (a), the polyurethane is reacted with the alcohol groups of the saturated alcohol to form polyols, ureas and carbamates (see column 3 lines 42 to 46).

In step (b), water and alkali metal hydroxide catalyst are added to the solution obtained in step (a), either separately or in the form of an aqueous catalyst solution, which results in breakdown of carbamates and ureas to give amines and alcohol. Steps (a) and (b) in their entirety should be regarded as hydroglycolysis (more accurately: hydroalcoholysis) with a time delay between addition of alcohol and water. Water is added in such an amount that the solution boils at temperatures between 175° C. and 200° C. In the case of diethylene glycol as alcohol, the water is added in an amount between 2.4% and 0.6%, preferably 1.1%, of the mass of the diethylene used (see column 4 lines 39 to 46). Water consumed in the hydrolysis is replaced by addition of further water in order to keep the water content constant. On completion of hydrolysis, the water used has to be removed in step (c) (column 5 lines 31 to 33) before extraction can be effected in step (e).

U.S. Pat. No. 4,317,939 describes a process in which a polyurethane foam is first dissolved in alcohol, then water and a catalyst are added, and the reaction mixture is heated under reflux. The result of reaction product is either monophasic, in which case it is purified by vacuum distillation, or biphasic, in which case a polyol phase is removed and purified by vacuum distillation. The polyols recovered in this way may be used in the production of new polyurethane foams.

Only few of the chemical recycling processes known from the literature are being implemented in a sustained manner on an industrial scale; many have not even reached pilot scale [1]. In view of generally increased environmental awareness and increased efforts to configure industrial processes to us to be sustainable as possible—both of which are fundamentally in favor of chemical recycling—this shows clearly that the chemical recycling of polyurethane products is still by no means mature from a technical and economic point of view. Challenges exist particularly with regard to the purity of the products recovered. Polyols must be recovered without amine impurities if at all possible, in order, for instance, not to adversely affect foaming characteristics in the case of reuse in the production of polyurethane foams. If another aim is recovery of amines, these must of course also be obtained in maximum purity. In addition, the polyurethane products to be reutilized usually still contain various auxiliaries and additives (stabilizers, catalysts and the like), which have to be separated from the actual target products of the recycling and disposed of in an economically viable and environmentally benign manner. Moreover, an economic recycling process must ensure that the reagents used (for example alcohols used) can be recovered and reused (i.e. recirculated) as completely as possible.

There was thus a need for further improvements in the field of chemical recycling of polyurethane products. In particular, it would be desirable to be able to recover polyols and preferably also amines in high purity and efficiently from polyurethane products, especially in a manner that would make industrial scale use economically achievable. It would additionally be desirable to have an available outlet for the auxiliaries and additives present in the polyurethane products which is acceptable from an economic and environmental point of view.

SUMMARY

Taking account of this requirement, the present invention provides a method for recovering raw materials (i.e. polyols and optionally additional amines) from polyurethane products, comprising the steps of (cf. also FIG. 1):

(A)—1000—providing a polyurethane product based on an isocyanate component and a polyol component (1);

(B)—2000—reacting the polyurethane product (1) with a (mono- or polyhydric) alcohol (2) in the presence of a catalyst, to give a first product mixture (3) containing (unreacted) alcohol, polyols (namely the polyols that make up the polyol component and/or polyols that may be formed from the original polyol component in the reaction with the alcohol (2)) and carbamates, and optionally water;

(C)—3000—working up the first product mixture (3), comprising:

(C.I)—3100—mixing the first product mixture (3) obtained in step (B) with a (water-insoluble) organic solvent (4) which is miscible with the alcohol (2) used in step (B), optionally followed by a removal of solid constituents, to obtain a second product mixture (5);

(C.II)—3200—(single- or multistage, especially two-stage) washing of the second product mixture (5) obtained in step (C.I) with an aqueous wash liquid (6), whereby carbamates present in the second product mixture (5) are partially hydrolyzed to release amines and alcohol, and phase separation into a first solvent phase (41) containing organic solvent used in step (C.I) and polyols (i.e. at least a first portion of the polyols from the first product mixture; therefore, the first solvent phase may also be referred to as first polyol phase), and a first aqueous phase (61) containing water, alcohol (used but not converted in step (B) and released in step (C.II) in the partial hydrolysis of the carbamates), carbamates and amines (and impurities originating from the polyurethane product);

(C.III)—3300—working up the first solvent phase to obtain the polyols;

and optionally (and preferably)

(D)—4000—working up the first aqueous phase to obtain an amine (8) corresponding to an isocyanate from the isocyanate component.

Polyurethane products in the context of the present invention are the polyaddition products (occasionally also referred to, albeit not entirely correctly, as polycondensation products) of polyfunctional isocyanates (=isocyanate component in the polyurethane preparation) and polyols (=polyol component in the polyurethane preparation). Polyurethane products generally contain, as well as the polyurethane base structure outlined above, other structures as well, for example structures having urea bonds. The presence of such structures differing from the pure polyurethane base structure alongside polyurethane structures does not leave the scope of the present invention.

In the terminology of the present invention, the term isocyanates encompasses all isocyanates known to the person skilled in the art in association with polyurethane chemistry, such as, in particular, tolylene diisocyanate (TDI; preparable and preferably prepared from tolylenediamine, TDA), the di- and polyisocyanates of the diphenylmethane series (MDI; preparable and preferably prepared from the di- and polyamines of the diphenylmethane series, MDA), pentane 1,5-diisocyanate (PDI; preparable and preferably prepared from pentane-1,5-diamine, PDA), hexamethylene 1,6-diisocyanate (HDI; preparable and preferably prepared from hexamethylene-1,6-diamine, HDA), isophorone diisocyanate (IPDI; preparable and preferably prepared from isophoronediamine, IPDA) and xylylene diisocyanate (XDI; preparable and preferably prepared from xylylenediamine, XDA). The expression "an isocyanate" of course also encompasses embodiments in which two or more different isocyanates (e.g. mixtures of MDI and TDI) were used in the preparation of the polyurethane product, unless explicitly stated otherwise, for instance by the formulation "exactly one isocyanate". This is also true within an isocyanate class (i.e. is also true, for example, of various MDI types). The entirety of all isocyanates used in the preparation of the polyurethane product is referred to as isocyanate component (of the polyurethane product). The isocyanate component comprises at least one isocyanate. Analogously, the entirety of all polyols used in the preparation of the polyurethane product is referred to as polyol component (of the polyurethane product). The polyol component comprises at least one polyol.

Isocyanate classes in the terminology of the present invention are considered to mean isocyanates having the same chemical base structure, with differences in a substitution pattern not yet being considered to be a departure from the chemical base structure. For instance, TDI and MDI belong to different isocyanate classes, but not their respective isomers with respect to one another. For example, all isomers of TDI (of which 2,4-TDI and 2,6-TDI are the most important) belong to the same "TDI isocyanate class", in the same way as all isomers of the isocyanates of the diphenylmethane series (of which 2,4'-MDI and 4,4'-MDI are the most important) belong to the same "MDI isocyanate class". The MDI types having three or more "benzene rings" are also assigned to the "MDI isocyanate class". The same applies to the amine classes.

In the terminology of the present invention, the term polyols encompasses all polyols known to the person skilled in the art in association with polyurethane chemistry, such as, in particular, polyether polyols, polyester polyols, polyetherester polyols and polyethercarbonate polyols. The expression "a polyol" does of course also encompass embodiments in which two or more different polyols were used in the production of the polyurethane product. This is also true within a polyol class. If, therefore, reference is made, for example, to "a polyether polyol" (or "a polyester polyol" etc.), this terminology does of course also encompass embodiments in which two or more different polyether polyols (or two or more different polyester polyols etc.) were used in the preparation of the polyurethane product.

Carbamates in the terminology of the present invention referred to the urethanes formed in step (B) by the reaction with the alcohol.

An amine corresponding to an isocyanate refers to that amine that can be phosgenated to give the isocyanate: $R—NH_2+COCl_2→R—N=C=O+2HCl$. Analogously, a nitro compound corresponding to an amine is that nitro compound that can be reduced to give the amine: $R—NO_2+3\ H_2→R—NH_2+2H_2O$.

The requirement of the invention that the organic solvent to be used in step (C.I) is miscible with the alcohol used in step (B) means that—under the conditions of temperature and ratio of organic solvents to alcohol from step (B) that exist for step (C.I)—a mixture of the organic solvent and the alcohol from step (B) does not separate spontaneously into two phases.

The first aqueous phase is generally a clear aqueous phase. However, it is not ruled out, and does not leave the scope of the invention, that the first aqueous phase contains an emulsion (i.e. in turn comprises a clear phase and an emulsion phase, in which case, in the terminology of the present invention, the entirety of clear phase and emulsion phase should be regarded as the first aqueous phase) or even constitutes an emulsion (i.e. is an emulsion phase in its entirety). Emulsion in this connection means an emulsion of organic constituents emulsified in aqueous medium.

The expression impurities originating from the polyurethane product in the context of the present invention are understood to mean those substances from the preparation of the polyurethane product that cannot be recovered as polyols or amines in chemical recycling, i.e., in particular, auxiliaries and additives from the preparation of the polyurethane product (stabilizers, catalysts, polymer particles and the like).

Figure 1:
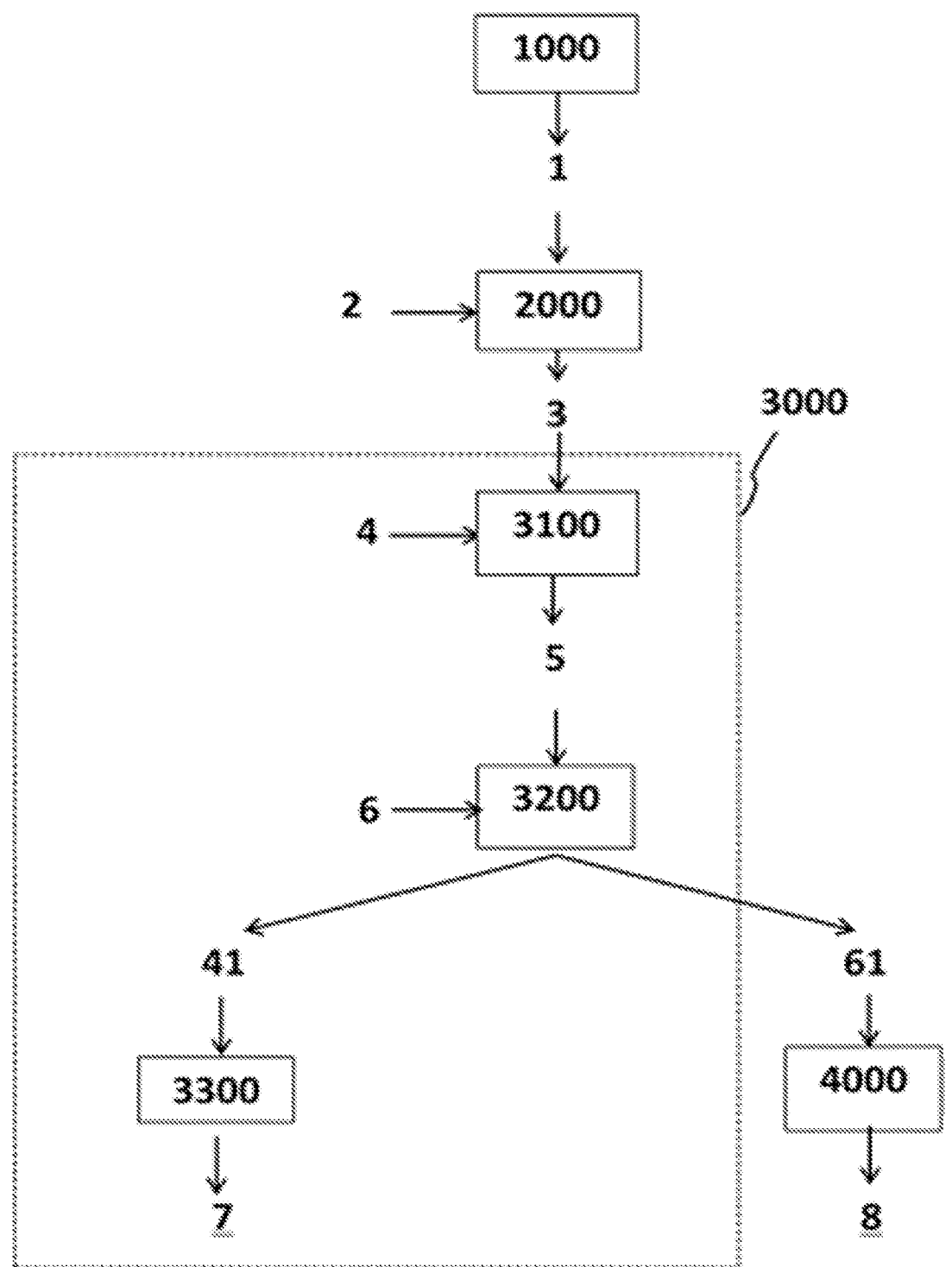
FIG. 1 a schematic diagram of the method of the invention in the simplest configuration (wherein the recovery of the amine (8) from the first aqueous phase (61) is optional)

There first follows a brief summary of various possible embodiments of the invention: In a first embodiment of the invention, which may be combined with all other embodiments, the first product mixture and the organic solvent are mixed in step (C.I) in a mass ratio in the range from 5:1 to 1:3.

DETAILED DESCRIPTION

In a second embodiment of the invention, which may be combined with all other embodiments, the first solvent phase in step (C.III) is subjected to a distillation and/or stripping with a stripping gas (such as, in particular, nitrogen or steam, preferably nitrogen).

In a third embodiment of the invention, which is a particular configuration of the second embodiment, the method in step (C.III) comprises a distillation in an evaporator selected from the group consisting of falling-film evaporators, thin-film evaporators, flash evaporators, rising-film evaporators, natural circulation evaporators, forced circulation evaporators and tank evaporators.

In a fourth embodiment of the invention, which is a particular configuration of the third embodiment, the method in step (C.III) comprises a stripping operation with steam downstream of the distillation.

In a fifth embodiment of the invention, which can be combined with all other embodiments except those that envisage a multistage washing operation in step (C.II), step (C.II) comprises exactly one wash stage in which a mass ratio of second product mixture to aqueous wash liquid used within a range from 20:1 to 1:1 is observed.

In a sixth embodiment of the invention, which can be combined with all other embodiments except those that envisage a single-stage washing operation in step (C.II), step (C.II) encompasses at least (preferably exactly) two wash stages, with each wash stage being followed by a phase separation to obtain a solvent phase and an aqueous phase, wherein the solvent phase obtained in the last wash stage is the first solvent phase and the first aqueous phase comprises (at least) the aqueous phase obtained in the first wash stage.

In a seventh embodiment of the invention, which is a particular configuration of the sixth embodiment, in each wash stage, a mass ratio
of
the second product mixture to be washed in a wash stage or the solvent phase to be washed
to
aqueous wash liquid used in a wash stage
in the range from 20:1 to 1:1 is observed.

In an eighth embodiment of the invention, which is a particular configuration of the sixth and seventh embodiments, the solvent phase obtained in the phase separation after the first wash stage is subjected to an evaporation of organic solvent, and the (concentrated) phase depleted of organic solvent which is obtained in this way is sent to the second wash stage.

In a ninth embodiment of the invention, which is a particular configuration of the eighth embodiment, the organic solvent obtained in the evaporation (optionally after a purification) is recycled into step (C.I).

In a tenth embodiment of the invention, which is a particular configuration of the sixth to ninth embodiments, the aqueous phases obtained in the at least (preferably exactly) two wash stages are combined to give the first aqueous phase.

In an eleventh embodiment of the invention, which can be combined with all other embodiments, the method comprises step (D).

In a twelfth embodiment of the invention, which is a particular configuration of the eleventh embodiment, step (D) comprises:
- (D.I) mixing the first aqueous phase with an organic solvent (especially with the same organic solvent which is used in step (C.I)) and phase separation into
  - a second solvent phase containing organic solvent used in step (D.I) and polyols (i.e. a second portion of the polyols from the first product mixture which is smaller than the first portion of the polyols; therefore, the second solvent phase may also be referred to as second polyol phase), and
  - a second aqueous phase containing alcohol, carbamates and amines (and impurities originating from the polyurethane product).

In a thirteenth embodiment of the invention, which is a particular configuration of the eleventh and twelfth embodiments, step (D) comprises:
- (D.II.a) hydrolyzing (especially in the presence of the catalyst) the carbamates present in the first aqueous phase or, if step (D.I) is performed, in the second aqueous phase to obtain a third product mixture containing water, alcohol (released in the hydrolysis and already present beforehand in the first or second aqueous phase) and amines (released in the hydrolysis and already present beforehand in the vessel second aqueous phase) (and impurities originating from the polyurethane product);
- (D.III.a) evaporating water (optionally—especially if step (D.I) is carried out—together with residual constituents of organic solvent) out of the third product mixture to leave an amine-alcohol mixture (containing impurities originating from the polyurethane product);
- (D.IV.a) evaporating an alcohol fraction from the amine-alcohol mixture to leave an amine phase (containing impurities originating from the polyurethane product);
- (D.V) recovering from the amine phase (at least) an amine corresponding to an isocyanate from the isocyanate component.

In a fourteenth embodiment of the invention, which is a particular configuration of the thirteenth embodiment, the water evaporated in step (D.III.a) (optionally after a purification) is recycled into step (C.II) as a constituent of the aqueous wash liquid.

In a fifteenth embodiment of the invention, which is a particular configuration of the thirteenth and fourteenth embodiments, the alcohol fraction evaporated in step (D.IV.a) is recycled into step (B).

In a sixteenth embodiment of the invention, which is a further particular configuration of the eleventh and twelfth embodiments, step (D) comprises:
- (D.II.b) evaporating a water-alcohol fraction from the first aqueous phase or, if step (D.I) is carried out, from the second aqueous phase, leaving a carbamate phase (containing impurities originating from the polyurethane product);
- (D.III.b) hydrolyzing (especially in the presence of the catalyst) the carbamates present in the carbamate phase to obtain a third product mixture containing water, alcohol (released in the hydrolysis and already present beforehand in the first or second aqueous phase) and amines (released in the hydrolysis and already present beforehand in the vessel second aqueous phase) (and impurities originating from the polyurethane product);
- (D.IV.b) evaporating an alcohol fraction from the third product mixture to obtain an amine phase (containing impurities originating from the polyurethane product);

(D.V) recovering from the amine phase (at least) an amine corresponding to an isocyanate from the isocyanate component.

In a seventeenth embodiment of the invention, which is a particular configuration of the sixteenth embodiment, the water-alcohol fraction evaporated in step (D.II.b) (optionally after a purification) is recycled into step (C.II) as a constituent of the aqueous wash liquid.

In an eighteenth embodiment of the invention, which is a particular configuration of the sixteenth and seventeenth embodiments, the alcohol fraction evaporated in step (D.IV.b) is recycled into step (B).

In a nineteenth embodiment of the invention, which is a particular configuration of the thirteenth to eighteenth embodiments, these embodiments encompass step (D.I) of the twelfth embodiment.

In a twentieth embodiment of the invention, which is a particular configuration of the nineteenth embodiment, in step (D.I), a mass ratio of first aqueous phase to organic solvents in the range from 20:1 to 1:3 is observed.

In a twenty-first embodiment of the invention, which is a particular configuration of the nineteenth and twentieth embodiments, the second solvent phase in step (C.II) is washed together with the second product mixture.

In a twenty-second embodiment of the invention, which is a particular configuration of the thirteenth to twenty-first embodiments, the method comprises the step of:

(E) providing a crude product fraction of an amine, which is the same amine which is recovered in step (D.V), where the crude product fraction comprises in addition to this amine (at least) organic impurities boiling at a higher point than this amine;

where step (D.V) comprises:

(D.V.1) mixing the amine phase with the crude product fraction and working up the resulting mixture, to give the amine contained in the crude product fraction together with the amine recovered from the amine phase.

In a twenty-third embodiment of the invention, which is a particular configuration of the twenty-second embodiment, the crude product fraction is taken from a bottom fraction of a distillation to purify the amine contained in the crude product fraction, where in step (D.V.1) additionally (i.e. in addition to the amine present in the crude product fraction and the amine obtained from the heating phase) a solid residue is obtained which comprises the organic impurities boiling at a higher point than this amine (and the impurities originating from the polyurethane product).

In a twenty-fourth embodiment of the invention, which is a particular configuration of the twenty-second embodiment, the crude product fraction is taken from a crude product of a process for producing the amine contained in the crude product fraction, and comprises organic impurities boiling at a lower point than this amine, and water, and is supplied to a distillation to remove water, in which a bottom fraction comprising this amine, organic impurities boiling at a lower point than this amine and organic impurities boiling at a higher point than this amine (and the impurities originating from the polyurethane product), and a top fraction comprising removed water (in addition to any residual amounts of organic impurities boiling at a lower point than this amine).

In a twenty-fifth embodiment of the invention, which is a particular configuration of the twenty-third and twenty-fourth embodiments, step (E) comprises:

(E.I) catalytically hydrogenating the nitro compound corresponding to the amine present in the crude product fraction, optionally in the presence of a solvent, to give a crude product comprising in addition to this amine organic impurities boiling at a higher point than this amine, organic impurities boiling at a lower point than this amine, and water;

(E.II) removing water from the crude product, to give a water-depleted process product;

(E.III) distilling the water-depleted process product, to give a distillate fraction of the amine present in the crude product fraction (i.e. the desired amine), and a bottom fraction containing in addition to this amine organic impurities boiling at a higher point than this amine.

In a twenty-sixth embodiment of the invention, which can be combined with all other embodiments, the isocyanate component contains an isocyanate selected from the group consisting of tolylene diisocyanate (TDI), the di- and polyisocyanates of the diphenylmethane series (MDI), pentane 1,5-diisocyanate (PDI), hexamethylene 1,6-diisocyanate (HDI), isophorone diisocyanate (IPDI), xylylene diisocyanate (XDI) and mixtures of two or more of the aforementioned isocyanates. The isocyanate component is preferably a mixture of TDI and MDI (i.e. contains a mixture of TDI and MDI without further isocyanates). More preferably, the isocyanate component is TDI (i.e. contains TDI and no further isocyanates).

In a twenty-seventh embodiment of the invention, which can be combined with all other embodiments, the polyol component contains a polyol selected from the group consisting of a polyether polyol, a polyester, a polyetherester polyol, a polyethercarbonate polyol and a mixture of two or more of the aforementioned polyols. The polyol component is preferably a polyether polyol. More preferably, the polyol component is a polyether polyol (i.e. does not contain any polyols other than polyether polyols; but a mixture of two or more different polyether polyols is encompassed and does not leave the scope of this embodiment).

In a twenty-eighth embodiment of the invention, which may be combined with all other embodiments, the organic solvent in step (C.I) is selected from the group consisting of halogen-substituted aliphatic hydrocarbons (such as, in particular, tetrachloromethane, chloroform and hexachloromethane), halogen-substituted alicyclic hydrocarbons (such as, in particular, chlorocyclohexane), halogen-substituted aromatic hydrocarbons (such as, in particular, monochlorobenzene and dichlorobenzene), and mixtures of two or more of the aforesaid organic solvents, and the alcohol in step (B) is selected from the group consisting of methanol, ethanol, ethylene glycol, diethylene glycol, propylene glycol, dipropylene glycol, methylglycol, triethylene glycol, glycerol, 2-methylpropane-1,3-diol, and mixtures of two or more of the aforesaid alcohols.

In a twenty-ninth embodiment of the invention, which is a particular configuration of the twenty-eighth embodiment, the organic solvent comprises halogen-substituted aromatic hydrocarbons, and the alcohol comprises ethylene glycol, diethylene glycol, propylene glycol, dipropylene glycol, methylglycol and/or triethylene glycol.

In a thirtieth embodiment of the invention, which is a particular configuration of the twenty-ninth embodiment, the organic solvent is dichlorobenzene (especially the ortho isomer), and the alcohol is diethylene glycol).

In a thirty-first embodiment of the invention, which can be combined with all other embodiments, the catalyst in step (B) is selected from the group consisting of alkali metal hydroxides, alkaline earth metal hydroxides, alkali metal salts of carboxylic acids (especially acetates), alkaline earth metal salts of carboxylic acids (especially acetates), Lewis acids (such as, in particular, dibutyltin dilaurate), organic amines (such as, in particular, diethanolamine), organometallic compounds (such as, in particular, titanium tetrabutoxide) and tin compounds (such as, in particular, tin octoate).

In a thirty-second embodiment of the invention, which is a particular configuration of the thirteenth to thirty-first embodiments, a catalyst used in step (D.II.a) or in step (D.III.b) is selected from the group consisting of alkali metal hydroxides, alkaline earth metal hydroxides, alkali metal salts of carboxylic acids (especially acetates), alkaline earth metal salts of carboxylic acids (especially acetates), Lewis acids (such as, in particular, dibutyltin dilaurate), organic amines (such as, in particular, diethanolamine), organometallic compounds (such as, in particular, titanium tetrabutoxide) and tin compounds (such as, in particular, tin octoate).

In a thirty-third embodiment of the invention, which can be combined with all other embodiments apart from those directed to polyurethane products other than polyurethane foams, the polyurethane product is a polyurethane foam.

In a thirty-fourth embodiment of the invention, which is a particular configuration of the thirty-third embodiment, the polyurethane foam is a flexible polyurethane foam.

In a thirty-fifth embodiment of the invention, which is a particular configuration of the thirty-third embodiment, the polyurethane foam is a rigid polyurethane foam.

In a thirty-sixth embodiment of the invention, which can be combined with all other embodiments apart from those directed to polyurethane products other than polyurethane elastomers, the polyurethane product is a polyurethane elastomer.

In a thirty-seventh embodiment of the invention, which can be combined with all other embodiments apart from those directed to polyurethane products other than polyurethane adhesives, the polyurethane product is a polyurethane adhesive.

In a thirty-eighth embodiment of the invention, which can be combined with all other embodiments apart from those directed to polyurethane products other than polyurethane coatings, the polyurethane product is a polyurethane coating.

In a thirty-eighth embodiment of the invention, which can be combined with all other embodiments, water is supplied to the reaction in step (B), if at all, in an amount such that the mass fraction of water, based on the total mass of polyurethane product in step (B) (i.e. immediately after the reactants have been mixed, i.e. prior to commencement of the urethane cleavage reactions), catalyst, alcohol and water, is in a range from 0% to 5.0%, preferably in a range from 0% to 3.0%, more preferably in a range from 0% to 2.0%, most preferably in a range from 0% to 1.6%. In this case, no further water is added after commencement of the reaction of the polyurethane product with the (mono- or polyhydric) alcohol in the presence of the catalyst (=water consumed by polyurethane cleavage reactions is not replaced).

The embodiments briefly outlined above and further possible configurations of the invention are more particularly elucidated hereinbelow. Various embodiments can be combined with one another in any way as long as the opposite is not clearly apparent to a person skilled in the art from the context.

Figure 2:
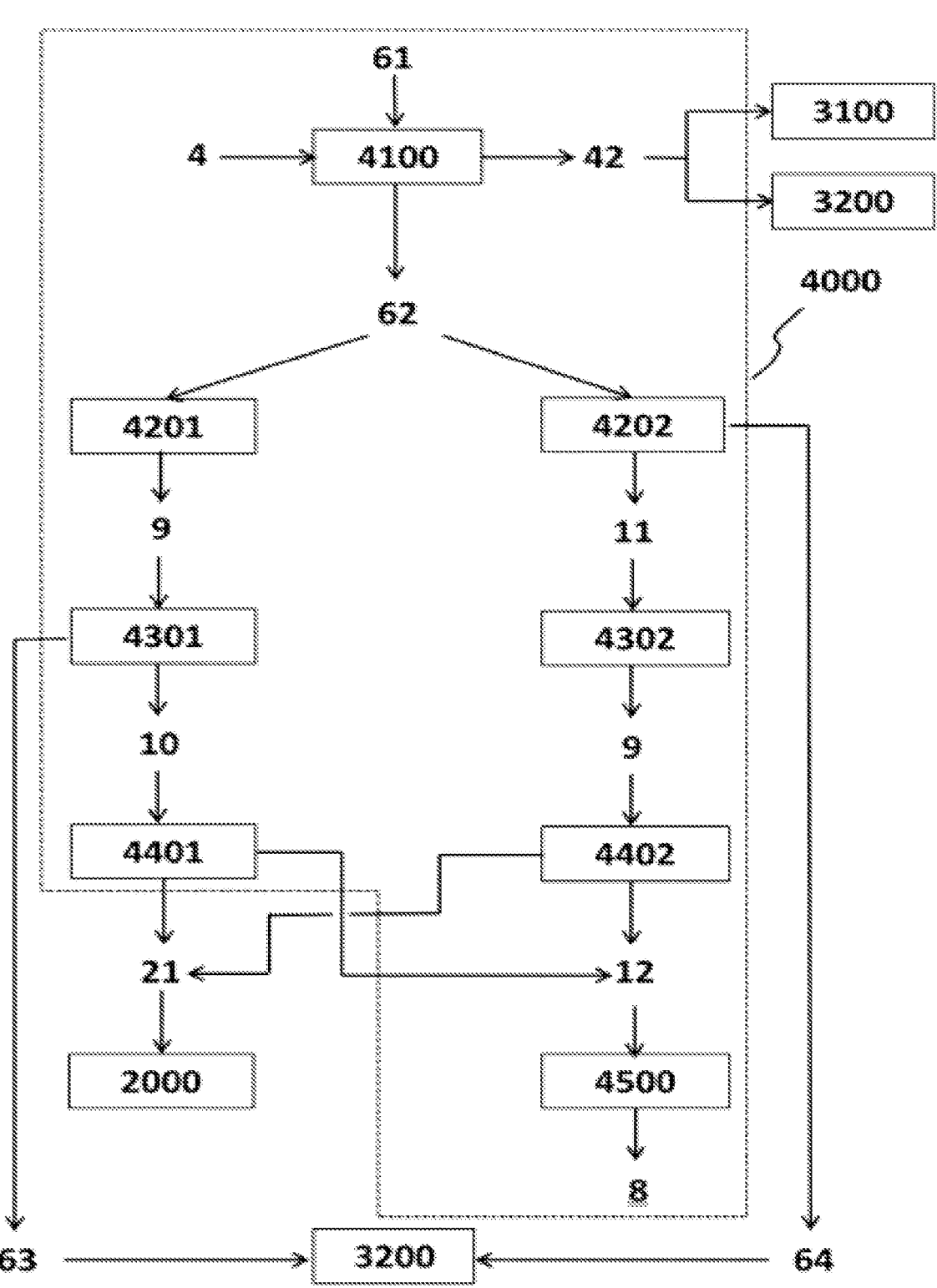
FIG. 2 a schematic diagram of a preferred embodiment of the step for obtaining amines (=step (D))

FIG. 1 shows a schematic diagram of the method of the invention in the form of a simple block flow diagram. The references in the figure have the following meanings:

1: polyurethane product;

2: alcohol;
3: first product mixture;
4: organic solvent; 41: first solvent phase;
5: second product mixture;
6 aqueous wash liquid; 61: first aqueous phase;
7: polyol;
8: amine;
1000: step (A) [provision of the polyurethane product];
2000: step (B) [reaction of the polyurethane product with an alcohol];
3000: step (C) [workup to obtain polyol]; 3100: step (C.I) [wash]; 3200: step (C.II) [wash including phase separation]; 3300: step (C.III) [further workup to polyol];
4000: step (D) [workup to obtain amine];

FIG. 2 shows a schematic diagram of an embodiment of the method of the invention, with emphasis on step (D). The references used have the same meaning as in FIG. 1. Additional references in the figure have the following meanings:

9: third product mixture;
10: amine-alcohol mixture;
11: carbamate phase;
12: amine phase;
42: second solvent phase;
62: second aqueous phase; 63: evaporated water, optionally containing fractions of solvent; 64: water-alcohol fraction;
4100: step (D.I) [blending with solvent, including phase separation];
4201: step (D.II.a) [hydrolysis]; 4301: step (D.III.a) [evaporation]; 4401: step (D.IV.a) [evaporation];
4202: step (D.II.b) [evaporation]; 4302: step (D.III.b) [hydrolysis]; 4402: step (D.IV.b) [evaporation];
4500: step (D.V) [amine recovery].

preparation OF THE CHEMICAL RECYCLING

In step (A) of the method of the invention (=1000 in the figures), the polyurethane product (1) to be chemically recycled is provided.

The polyurethane product may in principle be any kind of polyurethane product, i.e. either polyurethane foams or polyurethane products from what are called CASE applications. The polyurethane foams may be either flexible foams or rigid foams, preference being given to flexible foams (for example from used mattresses, furniture cushioning or car seats). In the case of polyurethane products from CASE applications, preference is given to polyurethane elastomers, polyurethane adhesives and polyurethane coatings.

In addition, preference is given to those polyurethane products that are based, with regard to the isocyanate component, on an isocyanate selected from the group consisting of tolylene diisocyanate (TDI), the di- and polyisocyanates of the diphenylmethane series (MDI), pentane 1,5-diisocyanate (PDI), hexamethylene 1,6-diisocyanate (HDI), isophorone diisocyanate (IPDI) and xylylene diisocyanate (XDI), and mixtures of two or more of the aforementioned isocyanates. Particular preference is given to polyurethane products that are based, with regard to the isocyanate component, on a mixture of TDI and MDI. Very particular preference is given to polyurethane products that are based solely on TDI with regard to the isocyanate component.

Preferably, step (A) comprises preparatory steps for the cleavage of the urethane bonds in step (B). These are especially mechanical comminution of the polyurethane products. Such preparatory steps are known to the person skilled in the art; reference is made by way of example to the literature cited in [1].

Chemical Cleavage of the Urethane Bonds

Step (B) of the method of the invention (=2000 in the figures) relates to the actual chemical recycling, the cleavage of the urethane bonds. Step (B) is performed as an alcoholysis (usually referred to in the literature as glycolysis; cf. no. 2 further up), especially at a temperature in the range from 160° C. to 240° C., i.e. as a reaction with an alcohol without the addition of significant proportions of water, by contrast with the process referred to in the literature as hydroglycolysis. What is meant by without the addition of significant proportions of water in this connection is that water is not deliberately added in such amounts that would result in a significant degree of hydroglycolysis (more accurately: hydroalcoholysis). This does not rule out the introduction of small amounts of water that are in dissolved form, for instance, in the alcohol used in step (B) and are introduced via the polyurethane product or may be used as solvent for the catalyst. It is likewise conceivable to add small amounts of water in step (B) in order to bring any precipitated salts into solution. It may be preferable here to add carbon dioxide to the water to be added and especially to saturate it therewith. This facilitates the dissolution of basic salts. Water is introduced into step (B) by the aforementioned sources in an amount such that the mass fraction of water, based on the total mass of polyurethane product in step (B) (i.e. immediately after the reactants have been mixed, i.e. prior to commencement of the urethane cleavage reactions), catalyst, alcohol and water (from any origin), is in a range from 0% to 5.0%, preferably in a range from 0% to 3.0%, more preferably in a range from 0% to 2.0%, most preferably in a range from 0% to 1.6%. These proportions, especially since water which is chemically consumed by urethane cleavage reactions is not replaced by addition of further water during the reaction in the method of the invention, are considerably smaller than typically used for hydroalcoholyses, and so the reaction that proceeds in step (B), even in the case of initial presence of small amounts of water, proceeds as "pure alcoholysis" even at a very early stage.

Water can be added for the purpose of dissolving salts even after alcoholysis, in the cooled state (especially after cooling to ambient temperature) In this case, the proportions by mass of water used for the purpose may also be higher than described above and especially up to 20%, based on the total mass of the reaction mixture before this addition of water and after alcoholysis in the cooled state. Here too, it may be preferable to add carbon dioxide to the water to be added and especially to saturate it therewith in order to facilitate the dissolution of basic salts.

This alcoholysis gives a first product mixture (3) containing polyols, carbamates and the unconverted fractions of the alcohol used, and optionally water. The reaction of the urethane bonds of a polyurethane product to be recycled with the alcohol used in step (B) releases the polyols bound in the urethane bonds, and a new urethane is formed with the alcohol used. For this new urethane, in the context of the present invention, the term carbamate is used by way of distinction from the original urethane. In the case of polyhydric alcohols, it is possible in principle for any alcohol group to enter into such carbamate formation reactions.

It is possible that the first product mixture (3) already contains amines. This is the case especially when the polyurethane product provided in step (A) contains a significant amount of ureas (formed, for example, by water-blown foaming). Such ureas then react with the alcohol used in step (B) to release amines.

The alcoholysis can in principle be conducted has known per se in the prior art.

Alcohols that are especially suitable for step (B) are methanol, ethanol, ethylene glycol, diethylene glycol, propylene glycol, dipropylene glycol, methylglycol, triethylene glycol, glycerol, 2-methylpropane-1,3-diol, or mixtures of two or more of the aforesaid alcohols. Particular preference is given here to ethylene glycol, diethylene glycol, propylene glycol, dipropylene glycol, methylglycol, pentylene glycol or mixtures of two or more of these. Very particular preference is given to diethylene glycol.

Particularly suitable as catalysts for step (B) are alkali metal hydroxides, alkaline earth metal hydroxides, alkali metal salts of carboxylic acids (in particular acetates), alkaline earth metal salts of carboxylic acids (in particular acetates), Lewis acids (such as in particular dibutyltin dilaurate), organic amines (such as in particular diethanolamine), organometallic compounds (in particular titanium tetrabutoxide), and tin compounds (such as in particular tin octoate). Step (B) is preferably carried out at temperatures within a range from 160° C. to 270° C. in the presence of 0.1% by mass to 5% by mass of catalyst, based on the mass of polyurethane product added.

The first product mixture obtained in this way may be (and preferably is indeed) monophasic. It is a great advantage of the present invention that the workup for isolation of the products of the chemical cleavage of the urethane bonds, i.e. at least of the polyols (cf. step (C)), preferably of the polyols and amines (cf. step (D)), is not based on achievement of a preliminary separation of the product mixture even in step (B), as is the case in many prior art methods that aim for a biphasic product (see [1] and the literature cited therein). This distinctly increases the degree of freedom in the choice of alcohol. However, polyphasicity of the first product mixture including any precipitation of solids is not an issue and does not leave the scope of the invention.

Recovery of Polyols

Step (C) of the method of the invention (=3000 in the figures) comprises the obtaining of polyols from the first product mixture obtained in step (B), i.e. there is no removal of water between steps (B) and (C) as in what is called the "Ford hydroglycolysis process" from the prior art. For this purpose, in a first step C. (=3100 in the figures), the first product mixture (3) obtained in step (B) is mixed with an organic solvent (4) which is miscible with the alcohol (2) used in step (B).

Suitable organic solvents for step (C.I) are especially halogen-substituted aliphatic hydrocarbons (such as, in particular, tetrachloromethane, chloroform and hexachloromethane), halogen-substituted alicyclic hydrocarbons (such as, in particular, chlorocyclohexane), halogen-substituted aromatic hydrocarbons (such as, in particular, monochlorobenzene and dichlorobenzene), and mixtures of two or more of the aforesaid organic solvents. From the above enumeration, particular preference is given to halogen-substituted aromatic hydrocarbons. Very particular preference is given to dichlorobenzene (especially the ortho isomer).

The alcohol used in step (B) and the organic solvent used in step (C.I) should any case be chosen such that the two are miscible under the conditions of step (C.I) (temperature and ratio of organic solvent to alcohol). Preferably, in step (C.I), the first product mixture and the organic solvent are mixed in a mass ratio of 5:1 to 1:3, preferably at a temperature in the range from 30° C. to 80° C. In order to achieve the desired miscibility, it is particularly preferable to use, as organic solvent, a halogen-substituted aromatic hydrocarbon and, as alcohol, ethylene glycol, diethylene glycol, propylene glycol, dipropylene glycol, methylglycol and/or triethylene glycol. In particular, the combination of dichlorobenzene (the ortho isomer of which is preferred) and diethylene glycol has been found to be useful. In the case of doubt, suitable combinations of alcohol and solvent can be rapidly ascertained by simple preliminary tests. On account of the inventive combination of mutually miscible organic solvents and alcohols, the second product mixture (5) obtained in step (C.I) is generally monophasic (which is indeed preferred). Depending on the exact nature of the polyurethane product provided in step (A), however, it is not possible to entirely rule out formation of a second phase in the individual case (possibly even a solid phase, for example when the polyurethane product is based on styrene-acrylonitrile copolymer polyols—also called polymer polyols [PMPO]). This does not leave the scope of the invention.

In a second step (C.II) (=3200, in the figures), the second mixture (5) obtained in step (C.I) is washed in one or more stages with a first wash liquid (6). Phase separation affords a first solvent phase (41) (comprising, in addition to polyols, solvent used in step (C.I)) and a first aqueous phase (61).

Step (C.II) can be conducted with extraction devices known per se to the person skilled in the art, such as, in particular, mixers (rotating, pulsed or static) with downstream static separators with or without internals or centrifugal separators. Temperatures of 20° C. to 80° C., preferably at least 10 K above the boiling point of the solvent used, optionally slightly elevated pressure via blanketing with nitrogen and prevention of gas formation, crossflow extraction and especially countercurrent extraction for reduction of the total amount of water are suitable as process conditions.

The wash can be effected in one stage, preferably observing a mass ratio of second product mixture to aqueous wash liquid used within a range from 20:1 to 1:1.

The wash may alternatively be effected in multiple stages, especially in two stages. A multistage wash in step (C.II) can be conducted by principles known to the person skilled in the art, for example as a crossflow extraction and/or countercurrent extraction, especially as a countercurrent extraction. In the case of a multistage wash, each wash stage is followed by a phase separation to obtain a solvent phase and an aqueous phase, with the solvent phase obtained in the last wash stage comprising the first solvent phase (41) and the first aqueous phase (61) comprising (at least) aqueous phase obtained in the first wash stage (in a preferred embodiment, all the aqueous phases obtained are combined to give the first aqueous phase). It is particularly preferable here, in each wash stage, to observe a mass ratio
of
  the second product mixture to be washed in a wash
    stage or the polyol phase to be washed
to
  aqueous wash liquid used in a wash stage
in the range from 20:1 to 1:1.

In the case of a multistage wash, it may be advantageous to subject the solvent phase obtained in the phase separation after the first wash stage to an evaporation of organic solvent, and to send the (concentrated) ("solvent") phase depleted of organic solvent that has been obtained in this way to the second wash stage. The organic solvent obtained in the evaporation may advantageously be recycled into step (C.I) (optionally after a purification).

The first solvent phase (41) thus obtained is worked up in step (C.III) (=3300 in the figures) to obtain polyols, which is preferably effected by distillation and/or stripping with a stripping gas (such as, in particular, nitrogen or steam, preferably nitrogen). This involves performing a distillation, preferably in an evaporator selected from the group consisting of falling-film evaporators, thin-film evaporators, flash evaporators, rising-film evaporators, natural circulation evaporators, forced circulation evaporators and tank evaporators. It is particularly preferable for the distillation to be followed by a stripping operation with steam.

A stripping operation with steam can be performed by passage of steam in stripping columns that are known per se to the person skilled in the art. However, stripping with steam can also be effected in such a way that water in liquid form is added to the first polyol phase (which has optionally already been prepurified in a distillation), followed by superheating (against a pressure adjusted by a pressure valve which is sufficient to keep the water in liquid form) and decompressing downstream of the pressure valve, as a result of which the water present in the polyol evaporates and has a stripping effect.

Recovery of Amines

Preferably, the invention also encompasses step (D), the obtaining of amines (=4000 in the figures; cf. also FIG. 2).

Preferably, first of all, in a step (D. (=4100), the first aqueous phase (61) is blended with an organic solvent (especially with the same solvent which is used in step (C.I); 4), which is followed by a phase separation into a second solvent phase (42) containing organic solvent used in step (D.I) and polyols (i.e. a second portion of the polyols from the first product mixture which is smaller than the first portion of the polyols; therefore, the second solvent phase can also be referred to as second polyol phase) and a second aqueous phase (62) containing alcohol, carbamates and amines (and impurities originating from the polyurethane product). In step (D.I), a mass ratio of first aqueous phase to organic solvent in the range from 20:1 to 1:3 is preferably observed. The second solvent phase obtained in performance of step (D.I) is preferably guided into step (C.II), combined with the second product mixture (5) and washed together therewith. For this purpose, the second solvent phase (41) (together with solvent (4)) can be sent to step (C.I) (=3100) or directly to step (C.II) (=3200). In the case of occurrence of a (semi-stable) emulsion (i.e. too long a separation time from a technical point of view) in the phase separation in the course of scrubbing in step (C.II), the first aqueous phase containing emulsified constituents (or consisting thereof) is sent to step (D.I), where the emulsion is broken, and the second aqueous phase and second solvent phase are obtained. If the breaking of the emulsion should not proceed spontaneously or proceed too slowly, this can be accelerated by addition of alcohol (2). Recycling of the second solvent phase that now contains the organic constituents formerly emulsified in the first aqueous phase into the wash step (C.II) prevents fractions of the polyol from escaping the polyol recovery in step (C.III) as a result of emulsification in the first aqueous phase.

There are two particularly preferred options for the further workup of the second aqueous phase in a step D.II, which are shown in FIG. 2:

In a variant a (shown on the left-hand side in FIG. 2), step (D.II) comprises the following component steps:
  (D.II.a)—4201—hydrolyzing (especially in the presence of the catalyst) the carbamates present in the first aqueous phase or, if step (D.I) is performed, in the second aqueous phase [HYDROLYSIS D.II.a] to obtain a third product mixture (9) containing water, alcohol (released in the hydrolysis and already present beforehand in the first or second aqueous phase) and amines (released in the hydrolysis and already present beforehand in the vessel second aqueous phase) (and impurities originating from the polyurethane product);

(D.III.a)—4301—evaporating water (63) (optionally—especially if step (D.I) is carried out—together with residual constituents of organic solvent) out of the third product mixture to leave an amine-alcohol mixture (10) (containing impurities originating from the polyurethane product);

(D.IV.a)—4401—evaporating an alcohol fraction (21) from the amine-alcohol mixture (10) (containing impurities originating from the polyurethane product).

The water (63) evaporated in step (D.III.a), which, as outlined above, in particular embodiments, may be in a mixture with solvent, can advantageously (optionally after purification) be recycled into step (C.II) and used therein as a constituent of the aqueous wash liquid (6). The alcohol fraction (21) evaporated in step (D.IV.a) can advantageously be recycled into step (B), where it can be used as a constituent of the alcohol (2) to be used.

In a variant b (shown on the right-hand side in FIG. 2), step (D.II) comprises the following component steps:

(D.II.b)—4202—evaporating a water-alcohol fraction (64) from the first aqueous phase (61) or, if step (D.I) is carried out, from the second aqueous phase (62), leaving a carbamate phase (11) (containing impurities originating from the polyurethane product);

(D.III.b)—4302—hydrolyzing (especially in the presence of the catalyst) the carbamates present in the carbamate phase to obtain a third product mixture (9) containing water, alcohol (released in the hydrolysis and already present beforehand in the first or second aqueous phase) and amines (released in the hydrolysis and already present beforehand in the vessel second aqueous phase) (and impurities originating from the polyurethane product);

(D.IV.b)—4402—evaporating an alcohol fraction (21) from the third product mixture (9) to obtain an amine phase (12) (containing impurities originating from the polyurethane product).

In this variant, in step (D.II.b), evaporation affords a water-alcohol fraction (64) which, in a preferred configuration (optionally after a purification), can be recycled into step (C.II) as a constituent of the aqueous wash liquid (6). The alcohol fraction (21) evaporated in step (D.IV.b) is preferably recycled into step (B).

In both variants, preference is given to using a catalyst in the hydrolysis step (=step (D.II.a) or step (D.III.b)). Particularly suitable for this purpose are alkali metal hydroxides, alkaline earth metal hydroxides, alkali metal salts of carboxylic acids (in particular acetates), alkaline earth metal salts of carboxylic acids (in particular acetates), Lewis acids (such as in particular dibutyltin dilaurate), organic amines (such as in particular diethanolamine), organometallic compounds (in particular titanium tetrabutoxide), and tin compounds (such as in particular tin octoate). In variant b, depending on how much water has been evaporated together with the alcohol in step (D.IIb), it may be advisable to add (some amount of) water again.

The main difference between the two variants is accordingly the different sequence of steps in the hydrolysis and evaporation. Both variants comprise a step (D.V), the recovery of the amine from the amine phase.

In a particularly advantageous embodiment of the invention, which offers an economic and environmentally benign outlet for impurities originating from the polyurethane product, the recovery of the amine from the same phase is incorporated into the workup of newly prepared amine, in that the amine phase (12) is mixed into a crude product fraction of the amine to be prepared.

(1) This particularly advantageous embodiment of the method of the invention is employable especially when the isocyanate component of the polyurethane product is based on exactly one isocyanate class. In such a case, the amine phase (12) obtained from the polyurethane product in the method of the invention contains only the amines that correspond to the isocyanates of the isocyanate class (and no others) and can therefore be mixed without any problem with a crude product fraction obtained in a process for preparing (i.e. newly preparing, as opposed to recovery by recycling) the same amine (of the same amine class).

(2) If the isocyanate component of the polyurethane product is based on isocyanates from different isocyanate classes, the particularly advantageous embodiment of the method of the invention mentioned is employable especially when the boiling points of the amine classes corresponding to the isocyanate classes differ in such a way that (exactly) one amine class boils at a much lower level (i.e. at least 20° C. lower) than the lowest-boiling other amine class present. In such a case, this embodiment may be used to recover the lowest-boiling amine class in the course of workup of newly prepared amine of the same amine class, with removal of amines of higher-boiling amine classes in the workup by conversion thereof to bottom fractions or to residues (see further down the details). For example, in the case of a polyurethane product based on a mixture of TDI and MDI with regard to its isocyanate component, the amine phase may be incorporated into the workup of a TDA crude product fraction by mixing the amine phase with such a TDA crude product fraction and working it up together therewith. In this workup, the newly prepared TDA and the TDA that comes originally from the polyurethane product are obtained together, while the MDA from the polyurethane product is removed as bottoms fraction in the distillative purification. It can either be recovered from this bottoms fraction in a further distillation step (at least the diamines from the diphenylmethane series), or the (physical) recovery of the MDA is dispensed with and it is allowed to go into the solid residue from the TDA production (see below for details).

For the sake of simplicity, the following detailed description is language-wise based on case (1), but is also applicable to case (2).

The preparation of amines that are important for polyurethane synthesis regularly gives rise to crude product fractions, for example as bottoms fraction from a distillation for purification of the desired amine or else as crude product of the preparation itself (optionally after removal of solvent), which, in addition to the desired amine, also contain impurities or coproducts (for example organic impurities boiling at a higher point than the amine (so-called high boilers), organic impurities boiling at a lower point than the amine (so-called low boilers) and/or water (of reaction)).

In this embodiment of the invention, the method of the invention therefore comprises a step (E), as follows:

(E) providing a crude product fraction of an amine, which is the same amine which is recovered in step (D.V), where the crude product fraction comprises, in addition to this amine, (at least) organic impurities boiling at a higher point than this amine;

where step (D.V) comprises:

(D.V.1) mixing the amine phase with the crude product fraction and working up the resulting mixture, to give the amine contained in the crude product fraction together with the amine recovered from the amine phase.

In a first preferred configuration of step (D.V.1), the crude product fraction is taken from a bottom fraction of a distillation to purify the amine contained in the crude product fraction, where in step (D.V.1) additionally (i.e. in addition to the amine present in the crude product fraction and the amine obtained from the heating phase) a solid residue is obtained which comprises the organic impurities boiling at a higher point than the amine (and the impurities originating from the polyurethane product).

Irrespective of the exact configuration of step (D.V.1), it is preferable that step (E) comprises the following:

(E.I) catalytically hydrogenating the nitro compound corresponding to the amine present in the crude product fraction, optionally in the presence of a solvent, to give a crude product comprising, in addition to this amine, organic impurities boiling at a higher point than this amine, organic impurities boiling at a lower point than this amine, and water;

(E.II) removing water from the crude product, to give a water-depleted process product;

(E.III) distilling the water-depleted process product, to give a distillate fraction of the amine present in the crude product fraction (i.e. the desired amine), and a bottom fraction containing in addition to this amine organic impurities boiling at a higher point than this amine.

Figure 3:
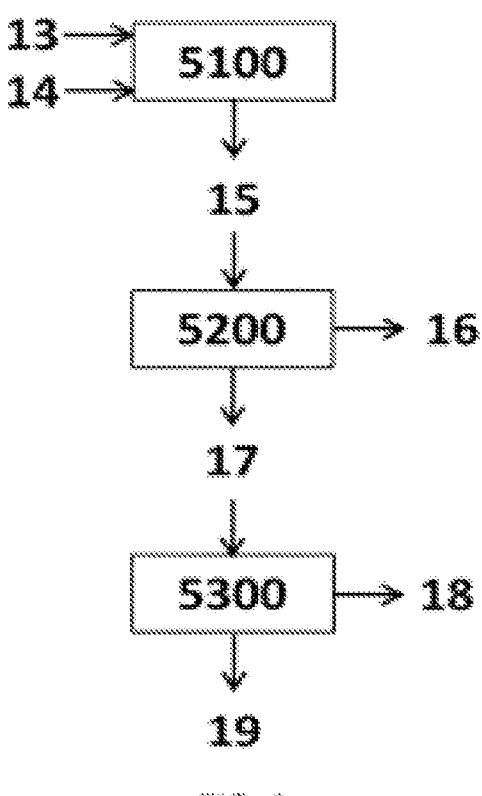
FIG. 3 a schematic diagram of a preparation process for an amine, which can be combined with step (D)

Steps (E.I) to (E.III) are shown schematically in FIG. 3. The references in the figure have the following meanings:

13: Hydrogen used for the hydrogenation;
14: Nitro compound corresponding to the amine;
15: Crude hydrogenation product;
16: Removed water;
17: Water-depleted process product;
18: Distillate fraction of the amine formed in the hydrogenation;
19: Bottom fraction of the distillation;
5100: Hydrogenation (step (E.I)); 5200: Water removal (step (E.II)); 5300: Distillation (step (E.III)).

Figure 4:
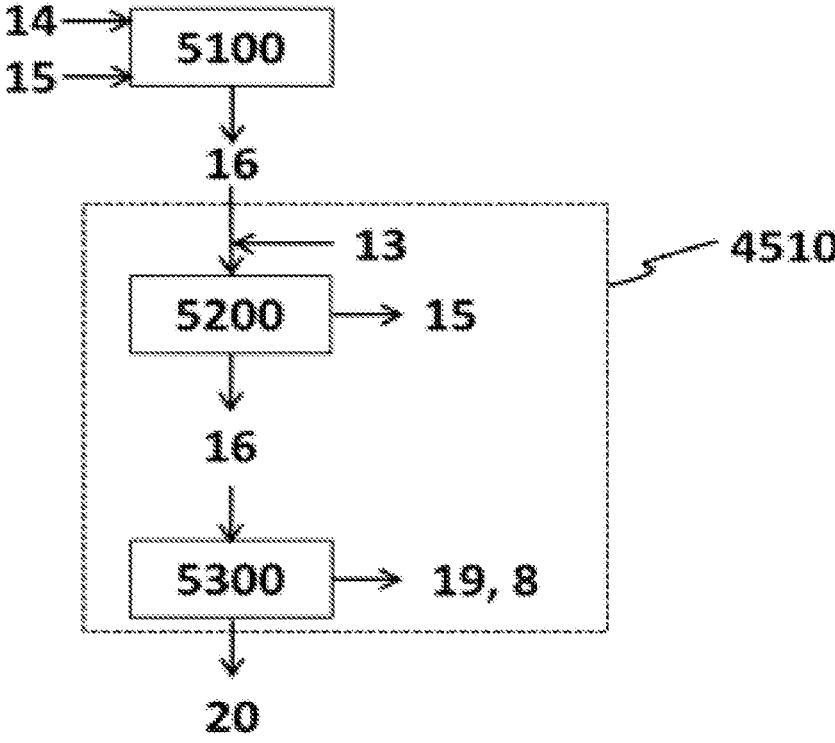
FIG. 4 one possible configuration of a combination of the preparation process for an amine with step (D) and FIG. 5 a further possible configuration of a combination of the preparation process for an amine with step (D).

In one embodiment of the invention, the amine phase (12) is mixed with the crude product of the hydrogenation (15) obtained in step (E.I) (which has merely been freed of any solvent present), i.e. the crude product fraction from step (E) is obtained as crude product from the hydrogenation (step E.I)=5100). The amine (8) coming from the polyurethane product is distilled off here together with the amine (18) coming from the (new) preparation. This is shown in FIG. 4, in which reference numerals already used have the same meaning as before, and 4510 represents step (D.V.1).

In this embodiment, the amine phase (12) is mixed into the crude product from the hydrogenation from step (E.I), especially before or in the step of water removal (step E.II)), wherein the water is preferably removed by distillation, for example as described in EP 0 236 839 A2. In this embodiment, the crude product fraction of the amine corresponding to isocyanate comprises in addition to the amine also organic impurities boiling at a lower point than the amine, and water, and is sent to a distillation for removal of water. In this distillation, a bottoms fraction containing the amine, organic impurities boiling at a lower point than the amine and organic impurities boiling at a higher point than the amine (and the impurities originating from the polyurethane product), and a top fraction containing removed water (possibly alongside residual amounts of organic impurities boiling at a lower point than the amine), are obtained. The impurities originating from the polyurethane product get into the bottoms fraction in the water removal step—step (E.II). In the subsequent step of a distillation—step (E.III)—they likewise get into the bottoms fraction.

Figure 5:
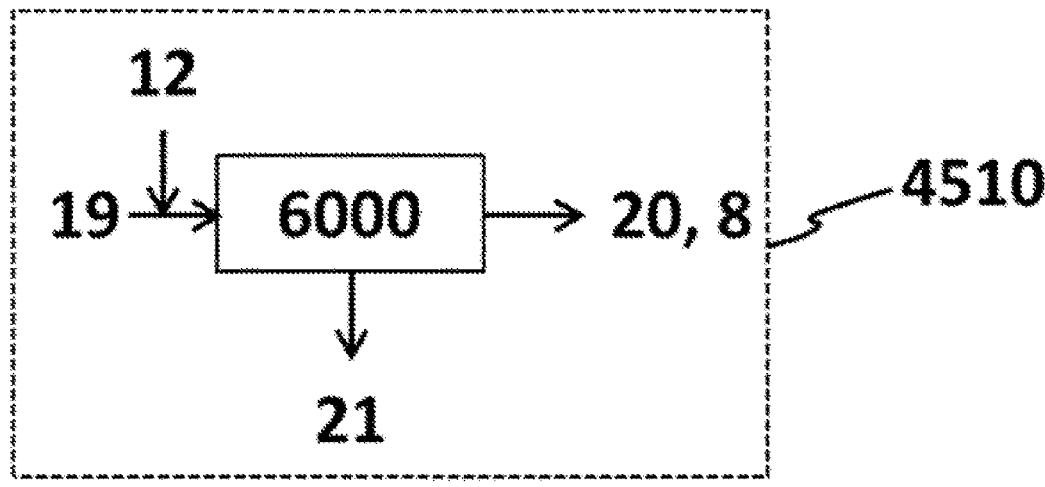

In a further embodiment of the invention, the amine phase (12) is mixed into the bottoms fraction (19) obtained in step (E.III), i.e. the crude product fraction from step (E) is obtained as bottoms fraction from the amine distillation (step E.III)=5300). Examples of such crude product fractions obtained as bottom fractions from the amine distillation are streams 5, 50 and 51 in figures FIG. 1 to 3 of international patent application WO 02/48075 A1, wherein the further workup of the streams can be effected as outlined in the document or else differently therefrom in drying apparatuses as outlined hereinafter. A further example of such crude product fractions is stream P4 in figures FIG. 1 to FIG. 5 of US patent specification U.S. Pat. No. 7,307,190 B2. Such bottom fractions are worked up in the prior art in order to recover amine present therein. For this purpose, the bottoms fraction is concentrated in drying apparatuses to give a solid residue, wherein amine can be distilled off and thus recovered. In the embodiment of the method of the invention mentioned, as a result of mixing of the amine phase (12) with the bottoms fraction (19), the recovery of amine coming from the (new) preparation of the amine (20) is associated with the recovery of the amine coming from the polyurethane product (8). As well as the amine (20, 8), this affords a solid residue (21) containing the high boilers present in the crude product fraction and the impurities originating from the polyurethane product. This is shown in FIG. 5, in which reference numerals already used have the same meaning as before, and 6000 represents the residue workup. Apparatuses suitable for such a workup are known to the person skilled in the art and are described, for example, in patent applications DE 10 2012 108 261 A1 (kneader-dryer, also mentioned in U.S. Pat. No. 3,307,190 B2 for workup of stream P4), EP 2 540 702 A2 (fluidized bed dryer) and WO 2018/114846 A1 (various dryer types). (The DE, EP and WO documents cited describe the workup of TDI residues, but the apparatuses are also usable for the workup of TDA residues.) The solid residue is obtained in such a workup process may be processed further as before; for example, they can be incinerated, gasified (i.e., by contrast with combustion, heated under a deficiency of oxygen) or pyrolyzed.

By the particularly advantageous embodiment of the invention outlined above, it is thus possible to convert impurities from the polyurethane product to a residue that occurs in any case, such that additional waste streams are reduced or avoided.

The invention is elucidated further hereinafter with the aid of examples.

Example

A TDI-based polyurethane foam was subjected to an alcoholysis with diethylene glycol (DET) in a mass ratio of 1:1 (steps (A) and (B)) of the method of the invention). The first product mixture thus obtained, according to analysis by H NMR/2D NMR spectroscopy with an internal standard, had the following composition (parts by mass based on the total mass of the first product mixture):

38% polyol, 42% DEG, and a total of 20% TDA and carbamates.

60 g of this first product mixture was introduced into a sample bottle, and 40 g of ortho-dichlorobenzene (ODB) was added. The bottle was closed and shaken manually for 5 min (step (C.I) of the method of the invention). The second product mixture thus obtained was monophasic. Subsequently, the monophasic second product mixture was transferred to a new sample bottle. After addition of 100 g of demineralized water, the sample bottle was closed and shaken manually for 5 min. The result was a biphasic mixture. The lower, heavy phase of 69 g (a solvent phase) contained primarily polyol and ODB; the upper, light phase (=first aqueous phase) of 131 g contained primarily DEG, water, amines and carbamate compounds. The two phases were separated from one another in a separating funnel (step (C.II) of the method of the invention, first wash stage).

37 g of the lower phase (containing polyol and ODB) was transferred into a sample bottle, and 37 g of demineralized water was added. The sample bottle was closed and shaken manually for 5 min. The upper, light phase (first solvent phase) and the lower, heavy phase (aqueous phase from the second stage) were separated from one another (step (C.II) of the method of the invention, second wash stage).

The following compositions were ascertained by means of analysis by H NMR/2D NMR with an internal standard (proportions by mass based on the total mass of the respective phase):

First Solvent Phase:

24% polyol, 74% ODB, 0.5% DEG, balance: TDA and carbamates.

First Aqueous Phase:

20% DEG, about 75% water, 0.6% ODB, <0.1% polyol, balance: TDA and carbamates.

The composition of the first solvent phase permits easy isolation of the polyol, for example by distillation (step (C III) of the method of the invention).

The invention claimed is:

1. A method for recovering raw materials from a polyurethane product, comprising:
(A) providing a polyurethane product that is based on an isocyanate component and a polyol component;
(B) reacting the polyurethane product with an alcohol in the presence of a catalyst, to give a first product mixture containing alcohol, polyols and carbamates, and optionally water;
(C) working up the first product mixture by a process comprising:
(C.I) mixing the first product mixture obtained in step (B) with an organic solvent which is miscible with the alcohol used in step (B), optionally followed by a removal of solid constituents, to obtain a second product mixture;
(C.II) washing the second product mixture obtained in step (C.I) with an aqueous wash liquid, whereby carbamates present in the second product mixture are partially hydrolyzed to release amines and alcohol, and phase separation into (a) a first solvent phase containing organic solvent used in step (C.I) and polyols, and (b) a first aqueous phase containing water, alcohol, carbamates and amines;
(C.III) working up the first solvent phase to obtain the polyols;
and optionally
(D) working up the first aqueous phase to obtain an amine corresponding to an isocyanate from the isocyanate component.

2. The method as claimed in claim 1, in which step (D) is conducted and comprises:

(D.I) mixing the first aqueous phase with an organic solvent and phase separation into (c) a second solvent phase containing organic solvent used in step (D.I) and polyols, and (d) a second aqueous phase containing alcohol, carbamates and amines.

3. The method as claimed in claim 1, in which step (D) is conducted and comprises:
(D.IIa) hydrolyzing the carbamates present in the first aqueous phase to obtain a third product mixture containing water, alcohol and amines;
(D.III.a) evaporating water out of the third product mixture to leave an amine-alcohol mixture;
(D.IV.a) evaporating an alcohol fraction from the amine-alcohol mixture to leave an amine phase; and
(D.V) recovering from the amine phase an amine corresponding to an isocyanate from the isocyanate component.

4. The method as claimed in claim 3, in which the water evaporated in step (D.III.a) is recycled into step (C.II) as a constituent of the aqueous wash liquid.

5. The method as claimed in claim 3, in which the alcohol fraction evaporated in step (D.IV.a) is recycled into step (B).

6. The method as claimed in claim 1, in which step (D) is conducted and comprises:
(D.II.b) evaporating a water-alcohol fraction from the first aqueous phase leaving a carbamate phase;
(D.III.b) hydrolyzing the carbamates present in the carbamate phase to obtain a third product mixture containing water, alcohol and amines;
(D.IV.b) evaporating an alcohol fraction from the third product mixture to obtain an amine phase; and
(D.V) recovering from the amine phase an amine corresponding to an isocyanate from the isocyanate component.

7. The method as claimed in claim 6, in which the water-alcohol fraction evaporated in step (D.II.b) is recycled into step (C.II) as a constituent of the aqueous wash liquid.

8. The method as claimed in claim 6, in which the alcohol fraction evaporated in step (D.IV.b) is recycled into step (B).

9. The method as claimed in claim 3, further comprising:
(E) providing a crude product fraction of an amine, which is the same amine which is recovered in step (D.V), where the crude product fraction comprises, in addition to the amine present in the crude product fraction, organic impurities boiling at a higher point than the amine present in the crude product fraction; and
where step (D.V) comprises:
(D.V.1) mixing the amine phase with the crude product fraction and working up the resulting mixture, to give the amine contained in the crude product fraction together with the amine recovered from the amine phase.

10. The method as claimed in claim 9,
in which the crude product fraction is taken from a bottom fraction of a distillation to purify the amine contained in the crude product fraction, where in step (D.V.1) additionally a solid residue is obtained which comprises the organic impurities boiling at a higher point than the amine present in the crude product fraction;
or
in which the crude product fraction is taken from a crude product of a process for producing the amine contained in the crude product fraction, and comprises organic impurities boiling at a lower point than the amine present in the crude product fraction, and water, and is supplied to a distillation to remove water, in which a bottom fraction comprising the amine present in the crude product fraction, organic impurities boiling at a lower point than the amine present in the crude product fraction and organic impurities boiling at a higher point than the amine present in the crude product fraction, and a top fraction comprising removed water.

11. The method as claimed in claim 10, in which step (E) comprises:

(E.I) catalytically hydrogenating the nitro compound corresponding to the amine present in the crude product fraction, optionally in the presence of a solvent, to give a crude product comprising, in addition to the amine present in the crude product fraction, organic impurities boiling at a higher point than the amine present in the crude product fraction, organic impurities boiling at a lower point than the amine present in the crude product fraction, and water;

(E.II) removing water from the crude product, to give a water-depleted process product; and (E.III) distilling the water-depleted process product, to give a distillate fraction of the amine present in the crude product fraction, and a bottom fraction containing, in addition to the amine present in the crude product fraction, organic impurities boiling at a higher point than the amine present in the crude product fraction.

12. The method as claimed in claim 1, in which the isocyanate component contains an isocyanate comprising tolylene diisocyanate, a di- and/or polyisocyanate of the diphenylmethane series, pentane 1,5-diisocyanate, hexamethylene 1,6-diisocyanate, isophorone diisocyanate, xylylene diisocyanate, or a mixture of any two or more thereof, and/or in which the polyol component contains a polyol comprising a polyether polyol, a polyester polyol, a polyetherester polyol, a polyethercarbonate polyol, or a mixture of any two or more thereof.

13. The method as claimed in claim 1, in which the organic solvent in step (C.I) comprises a halogen-substituted aliphatic hydrocarbon, a halogen-substituted alicyclic hydrocarbon, a halogen-substituted aromatic hydrocarbon, or a mixture of any two or more thereof, and the alcohol in step (B) comprises methanol, ethanol, ethylene glycol, diethylene glycol, propylene glycol, dipropylene glycol, methylglycol, triethylene glycol, glycerol, 2-methylpropane-1,3-diol, or a mixture of any two or more thereof.

14. The method as claimed in claim 1, in which the polyurethane product is a polyurethane foam, a polyurethane elastomer, a polyurethane adhesive or a polyurethane coating.

15. The method as claimed in claim 1, in which water is supplied to the reaction in step (B), if at all, in an amount such that the mass fraction of water, based on the total mass of polyurethane product in step (B), catalyst, alcohol and water, is in a range from 0% to 5.0%, with no further water being added after commencement of the reaction of the polyurethane product with the alcohol in the presence of the catalyst.

16. The method as claimed in claim 2, in which step (D) comprises:

(D.IIa) hydrolyzing the carbamates present in the second aqueous phase to obtain a third product mixture containing water, alcohol and amines;

(D.III.a) evaporating water out of the third product mixture to leave an amine-alcohol mixture;

(D.IV.a) evaporating an alcohol fraction from the amine-alcohol mixture to leave an amine phase; and (D.V) recovering from the amine phase an amine corresponding to an isocyanate from the isocyanate component.

17. The method as claimed in claim 2, in which step (D) comprises:

(D.II.b) evaporating a water-alcohol fraction from the second aqueous phase, leaving a carbamate phase;

(D.III.b) hydrolyzing the carbamates present in the carbamate phase to obtain a third product mixture containing water, alcohol and amines;

(D.IV.b) evaporating an alcohol fraction from the third product mixture to obtain an amine phase; and (D.V) recovering from the amine phase an amine corresponding to an isocyanate from the isocyanate component.

* * * * *